United States Patent Office 3,305,518
Patented Feb. 21, 1967

3,305,518
PLASTER COMPOSITION CONTAINING POLYVINYL ACETATE
Edwin J. Jakacki, Des Plaines, and Archie L. Hampton, Mount Prospect, Ill., assignors to United States Gypsum Company, a corporation of Illinois
No Drawing. Filed July 9, 1963, Ser. No. 293,827
6 Claims. (Cl. 260—41)

This invention relates to an improved gypsum plaster composition.

In a copending application Serial No. 293,900 filed July 9, 1963 by Edwin J. Jakacki there is disclosed gypsum plaster compositions having significantly improved properties attributable to the inclusion therein of minor amounts of a dead burned gypsum, the particles of which have specified Blaine surface area value. As disclosed in the copending application, the disclosure of which is hereby incorporated herein, the dead burned gypsum additive having a minimum Blaine surface area value of at least about 10,000 square centimeters per gram significantly improves the working or trowelling properties of a plaster composition in which it is incorporated. The additive markedly improves the fattiness and water retentivity of the plaster composition with the result that upon trowelling the plaster to form a wall a smooth surface relatively free from trowel marks, catfaces and other blemishes is obtained. Moreover, incorporation of the additive does not adversely affect the strength and surface hardness of the plaster when set. These novel plaster compositions are particularly adapted as "thin-coat" plasters which are sprayed on or applied by hand to a surface in a relatively thin coat.

It has now been found, in accordance with the present invention, that gypsum plaster compositions of the type disclosed in the said copending patent application can be further improved for certain applications by the inclusion therein of a minor amount of polyvinyl acetate.

The gypsum plaster compositions of this invention are comprised of the following ingredients in the proportions indicated:

|  | Parts by Weight | |
| --- | --- | --- |
|  | Operable Range | Preferred |
| Essential: |  |  |
| Calcium sulfate hemihydrate | 700 to 950 | 900 |
| Dead burned gypsum additive | 50 to 300 | 100 |
| Powdered polyvinyl acetate | 2 to 50 | 5 |
| Optional: |  |  |
| Aggregate (sand) | 0 to 1,500 | 700 |
| Set controlling additives | To obtain desired set, generally ¾ to 1½ hours clean set. |  |
| Ground hydrated lime | 0 to 100 | 50 |

The calcium sulfate hemihydrate (gypsum) component of the plaster composition can be either alpha or beta type gypsum although beta gypsum is preferred. In general, when alpha gypsum is employed greater amounts of the dead burned gypsum additive and/or lime are required for optimum improvement in working and finishing properties of the final plaster composition.

The dead burned gypsum additive is gypsum or calcium sulfate hemihydrate which has been calcined at temperatures sufficiently high so as to remove all of the water of hydration and to convert the calcium sulfate to anhydrous form which is non-hydrating or capable only of extremely slow hydration commonly referred to as insoluble anhydrite. In general, calcination temperatures as low as about 370° F. can be employed to produce dead burned gypsum, however, higher temperatures on the order of about 1000 to 1400° F. are generally utilized and preferred for this purpose. The dead burned gypsum additive is employed in accordance with this invention in finely divided condition such that the particles thereof have a Blaine surface area value of more than about 10,000 square centimeters per gram. The Blaine value or coefficient for surface area of the finely divided dead burned gypsum can be determined by procedure C204-55 of the American Society for Testing Materials as modified for plaster. To provide for more rapid testing, various powdered gypsum products such an anhydrite, hemihydrate, and di-hydrate calcium sulfate are tested at a porosity of 0.570. Sample size is calculated using the equation $W = PV(1-e)$ Where:

$W$ = sample weight
$P$ = specific gravity of sample
$V$ = volume of compacted bed (1.98 cc. for Unit No. J-3)[1]
$e$ = porosity of compacted bed.

[1] Using Precision Instrument Co. Blaine apparatus, Serial #J-3, sample weights and $K_2$ factors for various gypsum materials are:

| Material | Sample Weight, g. | Equation (3) |
| --- | --- | --- |
| Finely ground dead burned gypsum | 2.28 | $581\sqrt{T}$ |
| Gypsum ($CaSO_4 \cdot 2H_2O$) | 1.98 | $633\sqrt{T}$ |
| Alpha gypsum | 2.32 | $529\sqrt{T}$ |
| Beta gypsum | 2.28 | $536\sqrt{T}$ |
| Natural anhydrite, $CaSO_4$ | 2.52 | $497\sqrt{T}$ |

Specific surface area of sample is calculated from the following equation:

$$S = K \frac{\sqrt{e^3}\sqrt{T}}{P(1-e)\sqrt{n}} \qquad (2)$$

Where:

$S$ = Surface area
$K$ = Constant for individual apparatus as calculated using National Bureau of Standards Standard Sample No. 114 (for this unit, $K$ = 19.2)
$\sqrt{n}$ = 0.0136 at room temperature ($n$ = viscosity of air)
$T$ = Time in seconds for manometer fluid to move from second to third marks on instrument.

A simplified form of the Equation 2 is:

$$S = K_2\sqrt{T} \qquad (3)$$

where $K_2$ is a resolution of all the components of (2) except the variable T.

One method of preparing a dead burned gypsum additive suitable for use in accordance with the invention involves the use of a recalcined gypsum. An alpha or preferably beta type gypsum plaster is gauged with an excessive amount of water so as to form a very fluid slurry. This slurry is stirred constantly while the calcined gypsum is setting, that is, crystallizing from the hemihydrate to the dihydrate form. During this process, acicular crystals are formed which, by virtue of the constant agitation, are prevented from interlacing or joining together crystallographically to any great extent as is usual in the absence of agitation. A high percentage of fine, prismatic crystals are thus formed. After substantially complete hydration has occurred, the slurry is then filtered to remove excess water and the filter cake is calcined for periods generally ranging from 12 to 16 hours at temperatures preferably on the order of 1100 to 1500° F. The burned cake is ground in a hammer or other type mill to form thin prismatic crystals having a Blaine surface area value (BSA)

of at least about 10,000 square centimeters per gram.

In a slight modification of the above procedure in which crystal yield is improved somewhat, the agitation of the slurry is stopped immediately after hydration has taken place and the excess water is removed by filtering and washing with denatured alcohol. The crystals are then calcined and ground in any suitable mill or grinding apparatus to finely divided particle size as previously indicated.

The dead burned gypsum additive employed in the invention can also be attained by calcining gypsum rock in a suitable oven such as the well known beehive type oven. A temperature of 1000° should be reached within 12 hours and the calcination carried out at a temperature between 1000 and 1100° F. for 36 to 40 hours after which the temperature is raised to 1200 to 1400° F. When the oven has cooled, the gypsum rock is removed, given a preliminary crush to about 1 inch size and then ground to produce finely divided particles having a Blaine surface area value of more than about 10,000 square centimeters per gram.

Obviously, there is a relationship between the average particle size (microns) of the dead burned gypsum additive and the Blaine surface area value thereof. The Blaine surface area value increases as the particle size of dead burned gypsum decreases. However, the particle size of the dead burned gypsum need not be expressed for a clear understanding of the invention since the Blaine surface area value which is the critical factor is an inherent function thereof.

As indicated, sand is preferably employed in the plaster compositions of this invention. In a finishing plaster it is generally preferred to employ a graded aggregate such as sand of relatively uniform particle size such that 100% thereof will pass a #30 U.S. Standard sieve. However, other equivalent aggregates such as expanded perlite or vermiculite, pumice and the like can be employed in lieu of all or part of the sand.

The polyvinyl acetate component is a water-dispersible polyvinyl acetate which is added in the form of a fine, dry powder. One method of making water-dispersible polyvinyl acetate involves the polymerization of polyvinyl acetate in the presence of about 6% polyvinyl alcohol. The polyvinyl acetate emulsion can be spray dried in a hot gas to produce a dry powder. The set controlling additive which can be employed in plaster compositions of this invention can be any of those commonly employed in the art for controlling the setting time of plaster compositions. These include various accelerators such as aluminum sulfate, potassium sulfate, terra alba or set retarders such as the commercial keratinaceous retarders sodium citrate, citric acid, tartaric acid, Rochell salts and the like.

The plaster compositions of the invention are prepared by blending the various components in a dry state in the proportions indicated. After mixing, the dry plaster composition can be stored for long periods until such times as it is ready for use as a plaster by mixing water therewith. The dry plaster compositions have good shelf life and when mixed with water provide good finishing plasters which are particularly adapted for hand application. As is known in the art, a plaster which is applied by hand, in order for proper spreading, must have a thicker consistency than plasters adapted for machine application in a relatively fluid condition. Accordingly, the hand applied plasters must have better plasticity and fattiness characteristics for satisfactory working and trowelling. The plaster compositions of this invention have been found to possess excellent working characteristics, particularly with respect to fattiness and plasticity qualities. The dead burned gypsum additive having the specified minimum Blaine surface area value is unique in imparting these desired qualities to the plaster compositions. It is found also that polyvinyl acetate further enhances these properties, particularly in combination with hydrated lime which is employed in the preferred compositions. Not only does the polyvinyl acetate component cooperate in improving the working properties, but it acts to improve bonding of the plaster with paper as is utilized on gypsum laths and the like.

The variation of the ingredients within the ranges indicated affords a control of the degree of stiffening which gives extra body or firmness supplementing that provided by the loss of water to the base over which it is applied and which enhances the ability of the material to be smooth trowelled to a finish prior to set.

Those modifications and equivalents which fall within the spirit of the invention and the scope of the appended claims are to be considered part of the invention.

We claim:

1. Gypsum plaster comprising about 700 to 950 parts by weight of calcium sulfate hemihydrate, about 2 to 50 parts by weight of powdered water-dispersible polyvinyl acetate, and about 50 to 300 parts by weight of finely divided dead burned calcium sulfate having a Blaine surface area value of at least about 10,000 square centimeters per gram.

2. Gypsum plaster comprising about 900 parts by weight of calcium sulfate hemihydrate, about 5 parts by weight of powdered water-dispersible polyvinyl acetate, and about 100 parts by weight of finely divided dead burned calcium sulfate having a Blaine surface area value of at least about 10,000 square centimeters per gram.

3. Gypsum plaster comprising about 700 to 950 parts by weight of calcium sulfate hemihydrate, about 1 to 100 parts by weight of hydrated lime, about 2 to 50 parts by weight of powdered water-dispersible polyvinyl acetate, and about 50 to 300 parts by weight of finely divided dead burned calcium sulfate having a Blaine surface area value of at least about 10,000 square centimeters per gram.

4. Gypsum plaster comprising about 900 parts by weight of calcium sulfate hemihydrate, about 50 parts by weight of hydrated lime, about 5 parts by weight of water-dispersible polyvinyl acetate, and about 100 parts by weight of finely divided dead burned calcium sulfate having a Blaine surface area value of at least about 10,000 square centimeters per gram.

5. Gypsum plaster comprising about 700 to 950 parts by weight of calcium sulfate hemihydrate, about 1 to 100 parts by weight hydrated lime, about 2 to 50 parts by weight powdered water-dispersible polyvinyl acetate, about 50 to 300 parts by weight of finely divided dead burned calcium sulfate having a Blaine surface area value of at least about 10,000 square centimeters per gram, and 1 to 1500 parts by weight of aggregate.

6. Gypsum plaster comprising about 900 parts by weight of calcium sulfate hemihydrate, about 50 parts by weight of hydrated lime, about 5 parts by weight of powdered water-dispersible polyvinyl acetate, and about 100 parts by weight of finely divided dead burned calcium sulfate having a Blaine surface area value of at least about 10,000 square centimeters per gram, and 1 to 1500 parts by weight of aggregate.

References Cited by the Examiner

UNITED STATES PATENTS

| 2,526,537 | 10/1950 | Camp | 106—116 |
| 3,042,537 | 7/1962 | Newell et al. | 106—109 |
| 3,126,355 | 3/1964 | Birten et al. | 260—41 |

FOREIGN PATENTS

| 651,004 | 3/1951 | Great Britain. |

MORRIS LIEBMAN, *Primary Examiner.*

ALLAN LIEBERMAN, *Examiner.*